US010498630B1

(12) United States Patent
Rajashekara et al.

(10) Patent No.: US 10,498,630 B1
(45) Date of Patent: Dec. 3, 2019

(54) INTELLIGENT DEVICE SELECTION FOR PILOT TESTING

(71) Applicant: MICROSOFT TECHNOLOGY LICENSING, LLC, Redmond, WA (US)

(72) Inventors: Shashidhar Rajashekara, Sammamish, WA (US); Muskan Kukreja, Redmond, WA (US); Vijay Krishnan, Sammamish, WA (US); Sandi Ganguly, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/035,634

(22) Filed: Jul. 14, 2018

(51) Int. Cl.
*H04L 12/26* (2006.01)
*H04L 12/24* (2006.01)

(52) U.S. Cl.
CPC .......... *H04L 43/50* (2013.01); *H04L 41/0893* (2013.01); *H04L 41/12* (2013.01)

(58) Field of Classification Search
CPC .............. H04L 47/10; H04L 12/5602; H04L 2012/5636; H04L 2012/5632; H04L 47/35; H04L 47/30; H04L 47/32; H04L 43/50; H04L 43/00; H04L 1/00; H04L 43/0852; H04L 43/08; H04J 3/14; H04W 24/00; H04B 17/003; H04B 17/00; H04B 10/0771

(Continued)

(56) References Cited

U.S. PATENT DOCUMENTS 6,085,095 A * 7/2000 Collmann ............... H04M 3/36
455/446
7,010,295 B1 * 3/2006 Zerlan ................... H04W 24/00
375/224

(Continued)

FOREIGN PATENT DOCUMENTS

WO    2012167190 A1    12/2012

OTHER PUBLICATIONS

"Create a Device Pool in AWS Device Farm", Retrieved from: https://web.archive.org/web/20150717221738/https://docs.aws.amazon.com/devicefarm/latest/developerguide/how-to-create-device-pool.html, Jul. 17, 2015, 3 Pages.

(Continued)

*Primary Examiner* — Brenda H Pham
(74) *Attorney, Agent, or Firm* — NovoTechIP International PLLC (57) ABSTRACT

A device including a processor and memory is disclosed. The memory includes executable instructions that cause the processor to control the device to perform functions of identifying a pool of assets to be covered by a pilot test; receiving attributes associated with the identified assets in the pool; identifying a set of pilot test parameters associated with the pilot test; comparing the attributes of the assets with the identified set of pilot test parameters associated with the pilot test; based on a result of the comparison, providing a unique ranked order of the identified assets in the pool and selecting an asset from the unique ranked order to be placed in a pilot test group. When a stop condition is not satisfied, a footprint of the asset placed in the pilot test group is removed from the pool and the set of pilot test parameters.

20 Claims, 10 Drawing Sheets

(58) Field of Classification Search
USPC ....... 370/232, 233, 234, 235, 241, 242, 247, 370/248, 252
See application file for complete search history.

(56) References Cited

U.S. PATENT DOCUMENTS

| | | |
|---|---|---|
| 8,024,303 B2 | 9/2011 | Roehrle et al. |
| 8,990,639 B1 | 3/2015 | Marr et al. |
| 9,684,579 B1 | 6/2017 | Adams et al. |
| 9,703,691 B1 | 7/2017 | Yim et al. |
| 2007/0211640 A1* | 9/2007 | Palacharla .............. H04L 43/50 370/241 |
| 2008/0253296 A1* | 10/2008 | Kozek .................... H04L 1/243 370/248 |
| 2011/0088014 A1 | 4/2011 | Becker et al. |
| 2015/0317235 A1 | 11/2015 | Lachambre et al. |
| 2016/0241595 A1 | 8/2016 | Molloy et al. |

OTHER PUBLICATIONS

"Firebase Test Lab", Retrieved from: https://firebase.google.com/docs/test-lab/, Retrieved on: May 24, 2018, 4 Pages.

"Mobile App Testing Made Scalable", Retrieved from: https://bitbar.com/testing/, Retrieved on: May 24, 2018, 5 Pages.

"International Search Report and Written Opinion Issued in PCT Application No. PCT/US2019/037590", dated Sep. 16, 2019, 11 Pages.

* cited by examiner

| MK1 | P1 | P2 | P3 | P4 | USER2 |
|---|---|---|---|---|---|
| MO2 | PUB1 | PUB2 | PUB3 | PUB4 | IN1 |
| FREQ | VER1 | VER3 | VER2 | VER1 | CO1 |
| DUR | LAN2 | LAN2 | LAN2 | LAN2 | |
| | ADD1 | FREQ | ADD1 | FREQ | |
| | ADD2 | DUR | ADD2 | DUR | |
| | FREQ | | ADD3 | | |
| | DUR | | ADD4 | | |
| | | | FREQ | | |
| | | | DUR | | |

| MK1 | P1 | P2 | P3 | P4 | P5 | USER1 |
|---|---|---|---|---|---|---|
| MO1 | PUB1 | PUB2 | PUB3 | PUB4 | PUB5 | IN5 |
| FREQ | VER1 | VER3 | VER2 | VER1 | VER3 | CO5 |
| DUR | LAN1 | LAN1 | LAN1 | LAN1 | LAN1 | |
| | ADD1 | FREQ | ADD1 | FREQ | ADD1 | |
| | ADD2 | DUR | ADD2 | DUR | ADD2 | |
| | FREQ | | ADD3 | | FREQ | |
| | DUR | | ADD4 | | DUR | |
| | | | FREQ | | | |
| | | | DUR | | | |

| MK2 | P1 | P4 | USER3 |
|---|---|---|---|
| MO1 | PUB1 | PUB4 | IN4 |
| FREQ | VER1 | VER1 | CO4 |
| DUR | LAN3 | LAN3 | |
| | ADD1 | FREQ | |
| | ADD2 | DUR | |
| | FREQ | | |
| | DUR | | |

FIG. 2D — 244

| MK3 | P2 | P6 | USER4 |
|---|---|---|---|
| MO3 | PUB2 | PUB4 | IN2 |
| FREQ | VER3 | VER1 | CO2 |
| DUR | LAN1 | LAN1 | |
| | ADD1 | ADD2 | |
| | FREQ | FREQ | |
| | DUR | DUR | |

FIG. 2E — 254

| MK4 | P1 | P7 | P8 | USER5 |
|---|---|---|---|---|
| MO2 | PUB1 | PUB3 | PUB5 | IN3 |
| FREQ | VER1 | VER2 | VER3 | CO3 |
| DUR | LAN3 | LAN3 | LAN3 | |
| | ADD1 | ADD1 | ADD1 | |
| | ADD2 | ADD3 | ADD2 | |
| | FREQ | ADD4 | FREQ | |
| | DUR | FREQ | DUR | |
| | | DUR | | |

Progress
0% Complete
120 Days until target completion
0 of 3133 Devices Upgraded
Office 880    Windows 880
Days until end of support

| 1. Prepare | 2. Pilot | 3. Deploy |
|---|---|---|
| Last updated 9/20/2017 1:00 am | Last updated 9/20/2017 1:00 am | Last updated 9/20/2017 1:00 am |
| ▫ 63 readiness complete<br>▫ 2084 needs reinstall<br>▫ 2084 required replacement<br>▫ 493 in review | ▫ 0 pending upgrade<br>▫ 0 upgrade in progress<br>▫ 0 upgrade successful<br>▫ 0 upgrade failed | ▫ 0 pending upgrade<br>▫ 0 upgrade in progress<br>▫ 0 upgrade successful<br>▫ 0 upgrade failed |
| 2,639 Total Devices | 5% Devices Ready | 40 Pilot Devices | 0% Pilot Devices Upgraded | 2404 Production Devices | 0% Production Devices Upgraded |
| ▦ Identify important assets  723 | ▦ Deploy devices ready to pilot  0 | ▦ Export production devices  0 |
| ▦ Identify pilot devices  0 | ▦ View pilot deployment progress & issues  0 | ▦ View production deployment progress & issues  0 |
| ▦ Prepare pilot devices | ▦ Prepare production devices  0 | ▦ Monitor production health alerts  0 |
|  |  | ▦ View summary and archive plan  0 |

Identify Pilot

We have identified a set of devices that we rec[ommend for] maximum coverage and redundancy of your i[nstall...] your pilot group for this deployment plan, or cli[ck to...] a recommended replacement.

Your Configured Pilot Devices
Redundancy: 0%

What's Covered 0%

0   3   20   30
Devices Hardware Apps Office Add-ins
                        Apps + Add to pilot  – Replace

| Filter by... | Configured (40) | Recomm[ended] |  |
|---|---|---|---|
| ⊙ Name ∨ | Manufacturer ∨ | | Mod |
| Device 1 | XYZ Software | | 00 |
| Device 2 | XYZ Software | | 00 |
| Device 3 | XYZ Software | | 00 |
| Device 4 | XYZ Software | | 00 |
| Device 5 | XYZ Software | | 00 |
| Device 6 | XYZ Software | | 00 |

---

Learn More about your Pilot Recommendation Algorithm Information    ✕

⊙ Starting from your global pilot, we made sure to include and exclude the devices you picked.

⊙ Scanned all devices in this deployment plan to find all makes and models to consider.
23
Device Types ⊙ Covered all apps and add-ins assigned a validation plan.
8,500  »  8,000      300
      to Validate  Critical  Important ⊙ Calculated with high redundancy for highest statistical confidence and repusentation.
85%
Redundancy ⊙ Recommended the right set of devices to add for you to learn, understand, and deploy to production with confidence.

⊙ Go through the recommended list and add devices you want to configure, flag the devices you definitely want replaced.

↻ In our daily snapshot we'll assess your current coverage and recommend new additional devices

INTELLIGENT DEVICE SELECTION FOR PILOT TESTING

BACKGROUND

For any organizations with sizable IT assets, deploying new software or updating existing software to a newer version is an overwhelming task because very often the IT assets have different hardware/software configurations and it may simply impossible to predict how differently configured assets react to the deployment. Some organizations have relied on a lengthy full test pass prior to deployment. The full test pass model, however, cannot scale to faster cadence releases. Hence, some organizations have been dealing with this issue by a rule of thumb to complete the pre-deployment tests in a shorter period of time. For example, some IT professionals may manually select assets for pre-deployment pilot testing based on personal relationships with or availability of the users. Other IT professionals may randomly select a certain percentage of the total assets or a certain number of the assets based on the word-of-mouth in the industry, which has no scientific basis. These approaches, however, cause many problems. For example, in the software industry, one of the biggest challenges is compatibility of new software bits with existing assets (e.g., operating system, applications, versions, languages, addons, device maker/models, driver, etc.). By choosing manually or randomly selecting test sample asset, all the characteristic variations of the IT assets cannot be covered, and some of the characteristics of the assets may not be tested at all. There has been more elaborate approaches of determining a sample size based on a population size, but this approach has been proven unsuitable for the IT industry. Accordingly, there still remain significant areas for a new and improved method for more accurate and reliable IT asset sampling and selection for pre-deployment pilot tests.

SUMMARY

A device is disclosed, which includes one or more processors; and memory in communication with the one or more processors. The memory includes executable instructions that, when executed, cause the one or more processors to control the device to perform functions of identifying a pool of assets to be covered by a pilot test, the pool of assets being in communication with the device over a communication network; receiving over the communication network attributes associated with the identified assets in the pool; identifying a set of pilot test parameters associated with the pilot test; comparing the attributes of the assets with the identified set of pilot test parameters associated with the pilot test; based on a result of the comparison, providing a unique ranked order of the identified assets in the pool and selecting an asset from the unique ranked order to be placed in a pilot test group; determining if a predetermined stop condition has been satisfied based on a coverage of the set of pilot test parameters by one or more assets accumulated in the pilot test group; and upon determining that the predetermined stop condition has not been satisfied, removing a footprint of the asset placed in the pilot test group from the pool and the set of pilot test parameters.

In another implementation, a method is disclosed, which includes identifying a pool of assets to be covered by a pilot test, the pool of assets being in communication with a device over a communication network; receiving at the device and over the communication network attributes associated with the identified assets in the pool; identifying a set of pilot test parameters associated with the pilot test; comparing the attributes of the assets with the identified set of pilot test parameters associated with the pilot test; based on a result of the comparison, providing a unique ranked order of the identified assets in the pool and selecting an asset from the unique ranked order to be placed in a pilot test group; determining if a predetermined stop condition has been satisfied based on a coverage of the set of pilot test parameters by one or more assets accumulated in the pilot test group; and upon determining that the predetermined stop condition has not been satisfied, removing a footprint of the asset placed in the pilot test group from the pool and the set of pilot test parameters.

In another implementation, a system is disclosed, which includes a plurality of assets connected to a communication network, and a device configured to communicate with the plurality of assets via the communication network. The device includes one or more processors and memory in communication with the one or more processors. The memory includes executable instructions that, when executed, cause the one or more processors to control the device to perform functions of: identifying a pool of the assets to be covered by a pilot test; receiving over the communication network attributes associated with the identified assets in the pool; identifying a set of pilot test parameters associated with the pilot test; comparing the attributes of the assets with the identified set of pilot test parameters associated with the pilot test; based on a result of the comparison, providing a unique ranked order of the identified assets in the pool and selecting an asset from the unique ranked order to be placed in a pilot test group; determining if a predetermined stop condition has been satisfied based on a coverage of the set of pilot test parameters by one or more assets accumulated in the pilot test group; and, upon determining that the predetermined stop condition has not been satisfied, removing a footprint of the asset placed in the pilot test group from the pool and the set of pilot test parameters.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The instant application is directed to an intelligent and automatic selection of sample asset for validation and gradual rollout of software bits. Organizations have relied on a lengthy full test pass before deploying the latest version of software. However, the full test pass model cannot scale to faster cadence releases. The instant application provides an analytical approach to recommend a minimum number of assets that are required to provide a maximum coverage of the assets that are to be tested as part of rollout of software bits. The analytical approach takes into consideration sample sizes and builds redundancy. The aspects of the disclosure include unique modeling related to measuring a coverage and statistical redundancy in suggesting a pilot population, and a user interface providing the population in a unique ranked order which allows users to incrementally understand the experience and make decisions for each recommendation. The elements to achieve these aspects may include scanning assets and marking the assets critical, deciding a number of the total asset characteristic combinations. calculating a minimum number of the assets providing a desired coverage, calculating a redundancy multiple times; calculating statistical confidence of the coverage. and counting a proportion of the assets that are statistically covered.

Figure 1:
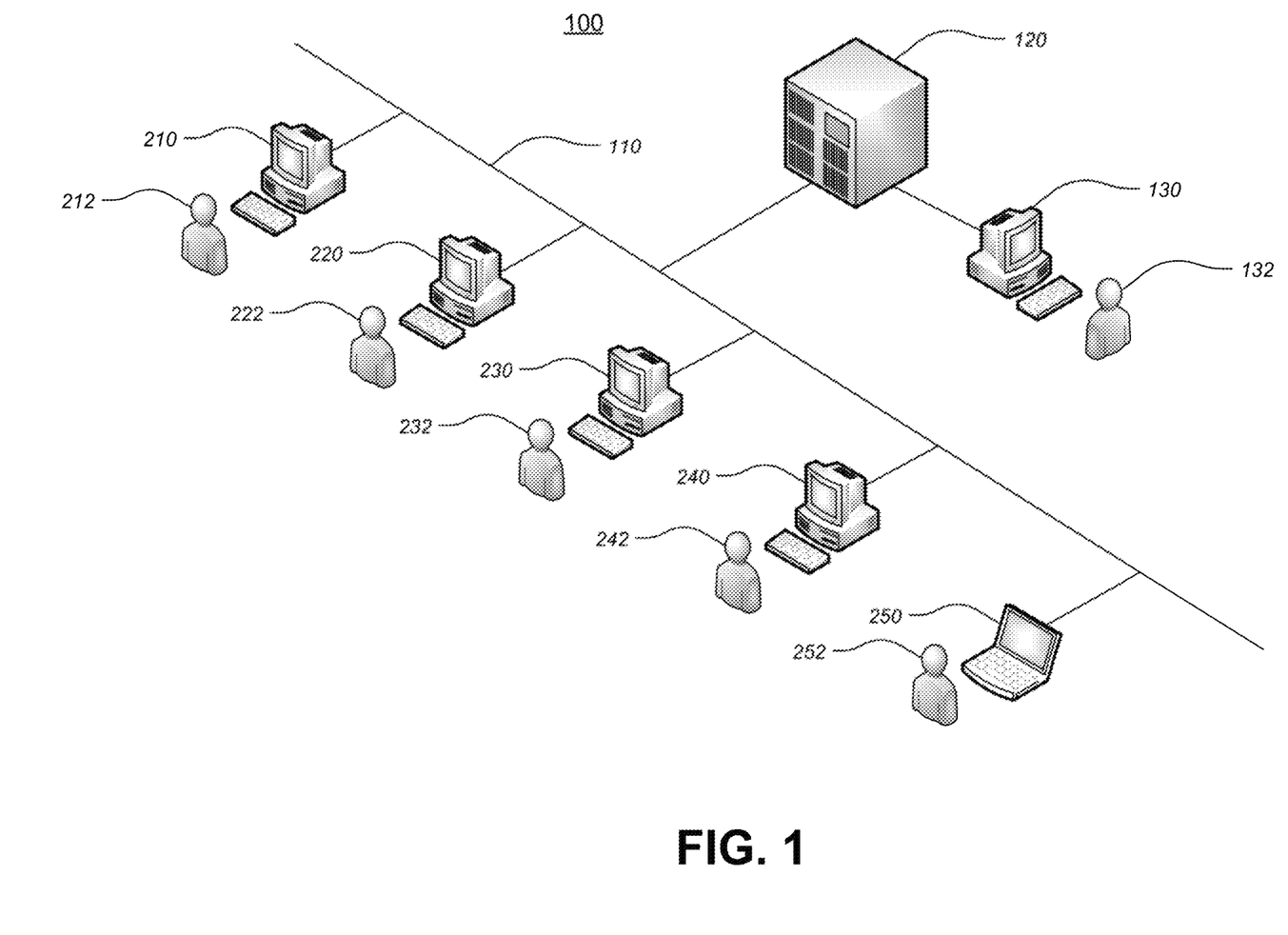
FIG. 1 illustrates an example IT system including a plurality of IT assets.

FIG. 1 illustrates an example IT system 100 of an organization, upon which aspects of this disclosure may be implemented. The IT system 100 may be implemented in a single site or spread out in a number of building or geographically separated locations. The IT system 100 may include a plurality of IT assets (hereinafter "assets"), including a first asset 210, second asset 220, third asset 230, fourth asset 240 and fifth asset 250, connected to a network 110. The network 110 may be a wired or wireless network or a combination of wired and wireless networks. The assets 210, 220, 230, 240, 250 may be assigned to and used by first, second, third, fourth and fifth users 212, 222, 232, 242, 252, respectively. The assets 210, 220, 230, 240, 250 may be connected to a server 120 via the network 110. In an implementation, the server 120 may be configured to perform automatic selection of sample assets for a pilot test. Alternatively, the automatic sample asset selection may be done by a device 130 connected locally or remotely to the network 110

In FIG. 1, only five assets 210, 220, 230, 240, 250 are shown, but the actual number of the assets in the IT system 100 may vary depending on the size and type of the organization. For example, the IT system 100 for a large IT company may include more than a thousand or ten thousand assets, which may be spread out in different geographical locations. The assets may be any stationary or mobile computing device configured to communicate via the network 110. For example, the assets may be a workstation, desktop, laptop, tablet, smart phone, cellular phone, personal data assistant (PDA), printer, scanner, telephone, or any other device that can be subject to software/hardware changes. While it is possible for a very few of the assets to have exactly the same hardware/software configuration, most of the assets may have a unique hardware/software configuration that may be drastically different from one to another. The unique hardware or software configuration characteristics of an asset are referred to as attributes. In an implementation, the device 130 may scan the assets 210, 220, 230, 240, 250 to create a list of various attributes of the assets 210, 220, 230, 240, 250. Alternatively, the list of attributes of the assets 210, 220, 230, 240, 250 may be created by another device, for example, sever 120, and provided to the device 130, which may be remotely located.

FIGS. 2A to 2E illustrate example attributes of the assets 210, 220, 230, 240, 250, respectively. The attributes may be divided into hardware attributes, software attributes and user attributes. In an implementation, the hardware attributes may include an asset maker/manufacturer (MK), asset model (MO), usage frequency (FREQ) and usage duration (DUR) attributes. The FREQ attribute may indicate how often the asset has logged in to the network 100 for a predetermined time period. For example, when the user of the asset has left for a vacation, the FREQ attribute may indicate that the asset has not logged in to the network 110 for the several days. The DUR attribute may indicate how long the asset stays connected to the network 110. The FREQ and DUR attributes may be factored in to decide how the particular asset is likely to be available for a pilot test planned for a certain day.

The software attributes may include a software/program name (P), software publisher (PUB), software version (VER), software language (LAN), addon (ADD), FREQ and DUR attributes. The ADD attribute may indicate a macro, plugin or patch that have been added to the software. It is common for a software program to have two or more addons, and the ADD attribute may be created for each addon. Similar to the hardware FREQ and DUR attributes, the software FREQ and DUR attributes may indicate how often and how long the software has been used, respectively.

The user attributes may include a user identification (USER), user influence (IN) and user collaborativeness (CO) attributes. The USER attribute may be a name or login ID of the user of the asset. The IN attribute may indicate how influential the user of the asset is. For example, the user of the asset may be an executive or project leader who has a lot of influence on other users. The CO attribute may indicate how collaborative the user of the asset is, which may be determined based on the user's acceptance rate for the prior pilot tests. The IN and CO attributes may be factored in to select sample assets for a critical pilot test, for example, an urgent mission-critical update.

Figure 2A:
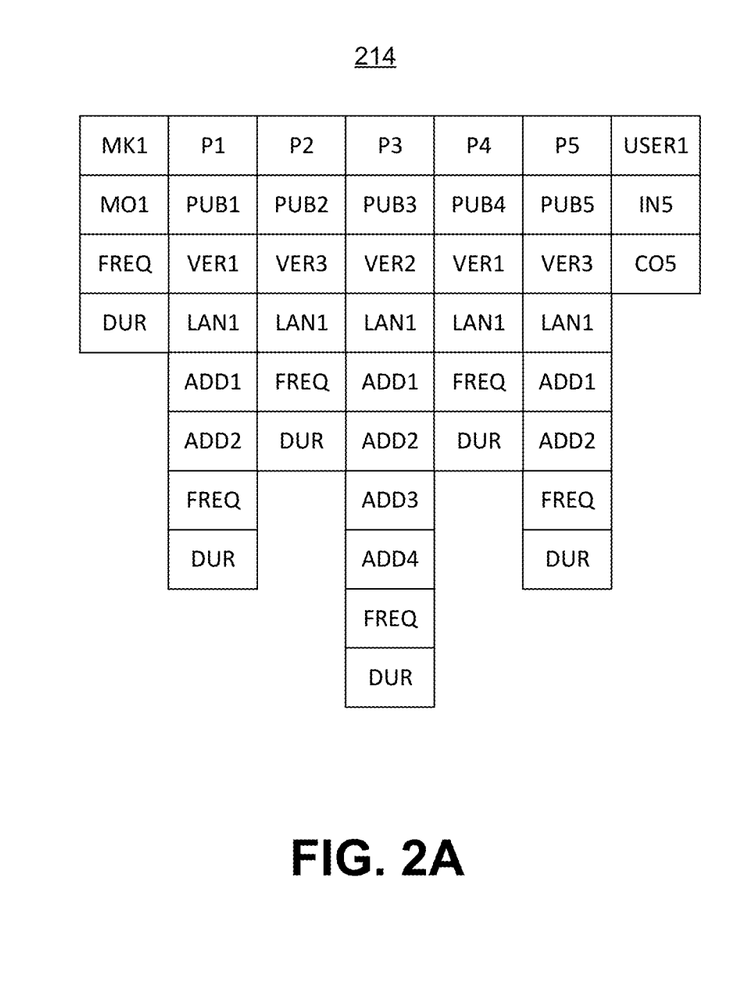
FIGS. 2A to 2E illustrate example attributes of the IT assets shown in FIG. 1
Figure 2B:
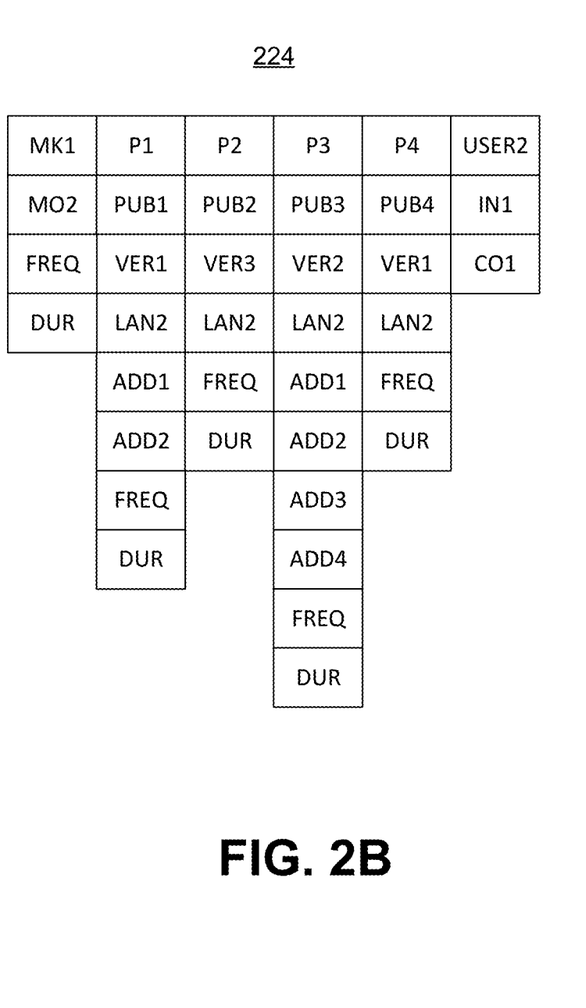

FIG. 2A illustrates exemplary first attributes 214 of the first asset 210. The first attributes include hardware configuration attributes, such as, a maker attribute MK1 (e.g., ABC), model attribute MO1 (e.g., 1000-123), usage frequency attribute (e.g., daily) and usage duration attribute (e.g., 38 hours for the last 5 days). The software configuration attributes include P attributes P1, P2, P3, P4, P5, which indicates that five software programs P1, P2, P3, P4, P5 are currently installed in the first asset 210. One or more additional attributes may be tied to each software/program name attribute. For example, the publisher attributes PUB1 (e.g., XYZ), version attribute VER1 (e.g., version 1.0), language attribute LAN1 (e.g., English), addon attributes ADD1 (e.g., macro), ADD2 (e.g., patch), usage frequency attribute (e.g., daily) and usage duration attribute (e.g., 37 hours for last 5 days) may be tied to the P1 attribute (e.g., operating system). Similarly, other P attributes P2, P3, P4, P5 may be tied to additional attributes, as shown in FIG. 2A. The user attributes includes the user attribute USER1 (e.g., user name or login ID), user influence attribute IN5 (e.g., lowest user influence) and collabrativeness attribute CO5 (e.g., lowest user collaborativeness).

FIGS. 2B, 2C, 2D and 2E illustrate exemplary second, third, fourth and fifth attributes 224, 234, 244, 254 of the second, third, fourth and fifth assets 220, 230, 240, 250, respectively. In the second attributes 224 of the second asset 220 shown in FIG. 2B, the model attribute MO2 (e.g., 1000-456) is different from the model attribute MO1 (e.g., 1000-123) of the first asset 210. Also, the second attributes 224 indicate that the fifth software program P5 is not installed in the second asset 220, and the language attribute LAN2 (e.g., Spanish) are tied to the software programs P1, P2, P3 and P4. The second attributes 224 further indicate that the user of the second asset 220 has the user influence attribute IN1 (e.g., highest influence) and collaborativeness attribute CO1 (e.g., highest collaborativeness).

Figure 2C:
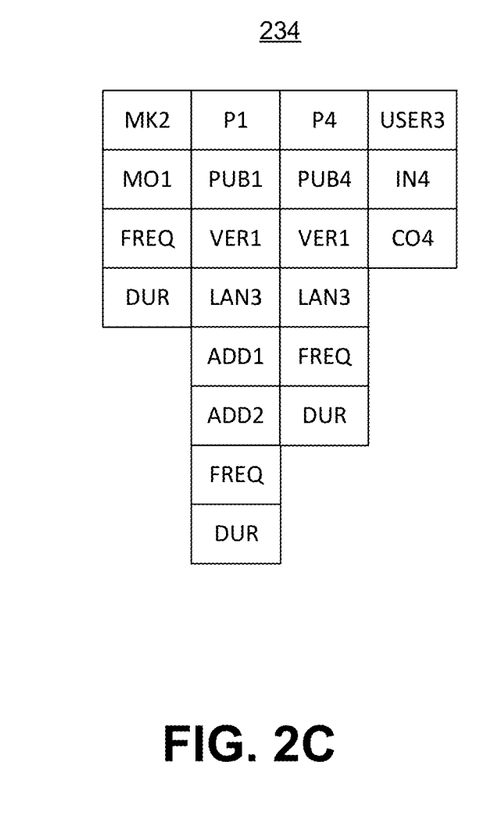

Referring to FIG. 2C, in the third attributes 234 of the third asset 230, the maker attribute MK2 indicates that the maker of the third asset 230 is different from the maker MK1 of the first and second assets 210, 220. Also, only the first and fourth software programs P1, P4 are installed in the third asset 230, and the language attribute is LAN3 (e.g., French). The third attributes 234 further indicate that the user, USER3, of the third asset 230 has the user influence attribute IN4 (e.g., lower than average influence) and collaborativeness attribute CO4 (e.g., lower than average collaborativeness).

Figure 2D:
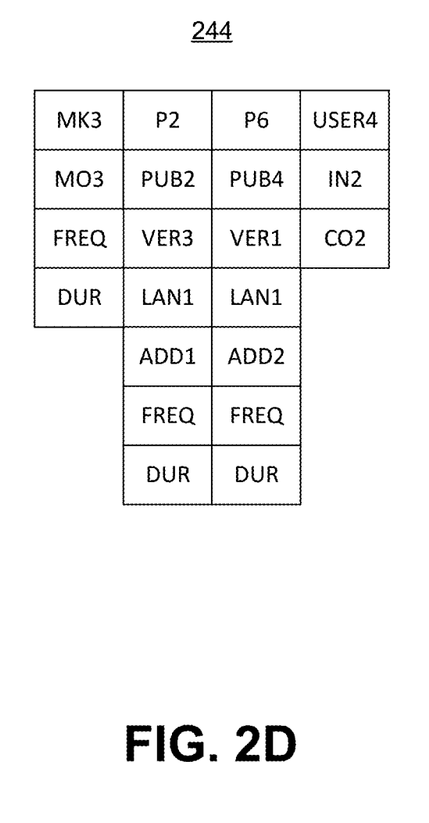

Referring to FIG. 2D, the fourth attributes 244 of the fourth asset 240 include a maker attribute MK3, which is different from the maker attributes of the first, second and third assets 210, 220, 230. Also, the software configuration attributes P2, P6 indicate that the software program P2 and P6 are installed in the fourth asset 240. The software program P6 is not installed in any of the first, second and third assets 210, 220, 230. The user attributes indicate that the fourth user, USER4, has the user influence attribute IN2 (e.g., higher than average influence) and collaborativeness attribute CO2 (e.g., higher than average collaborativeness).

Figure 2E:
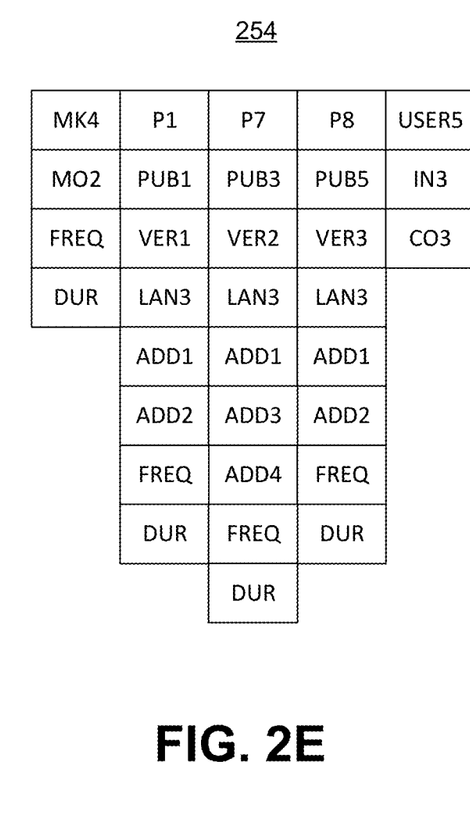

Referring to FIG. 2E, the fifth attributes 254 of the fifth asset 250 includes a maker attribute MK4, which is different from the maker attributes MK1, MK2 and MK3 of the first, second, third and fourth assets 210, 220, 230, 240. The software/program name attributes P1, P7, P8 indicate that the first, seventh and eights software programs P1, P7 and P8 are installed in the fifth asset 250, of which the seven and eights software programs P7 and P8 are not installed in any of the first, second, third and fourth assets 210, 220, 230, 240. The software attributes P1, P7 and P8 are tied to the language attributes LAN3 (e.g., French), which indicates that the language for the first, seventh and eights software programs P1, P7 and P8 is French. The user attributes indicates that the fifth user USER5 has the user influence attribute IN3 (e.g., average influence) and collaborativeness attribute CO3 (e.g., average collaborativeness).

Figure 3:
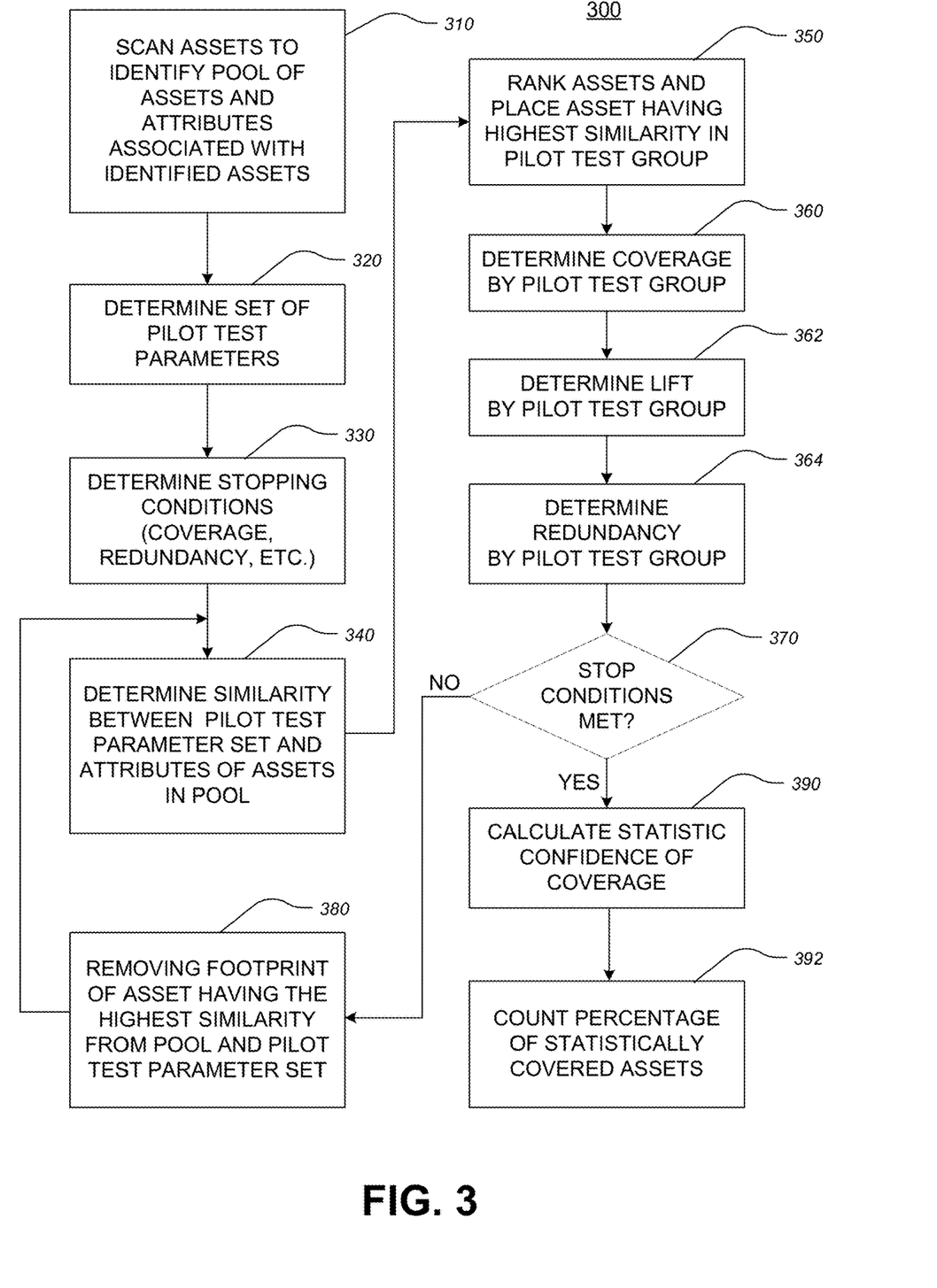
FIG. 3 illustrates a flowchart of an example process for automatically selecting sample assets for a pilot test.

FIG. 3 illustrates a flowchart of an example process 300 for automatically selecting sample assets for a pilot test. The process 300 is described below with reference to the IT system 100 shown in FIG. 1 and the various attributes shown in FIGS. 2A to 2E. However, the process 300 can be carried out in any IT system and hence is not limited to the particular implementations described in this disclosure.

At Step 310, the device 130 may scan the assets of the IT system 100 to identify a pool of the assets that are subject to a particular rollout. For example, when a rollout is planned to update the operating system (OS) for desktop and laptop computers, mobile devices operating on a mobile OS may be excluded from the asset pool. When scanning the assets, the device 130 may also identify and collect the attributes associated with the identified assets in the pool. For example, the device 130 may scan the assets of the IT system 100 and include the assets 210, 220, 230, 240, 250 in the asset pool for the rollout, and collect the attributes of the assets 210, 220, 230, 240, 250. The example collected attributes of the assets 210, 220, 230, 240, 250 are shown in FIGS. 2A to 2E.

Figure 4A:
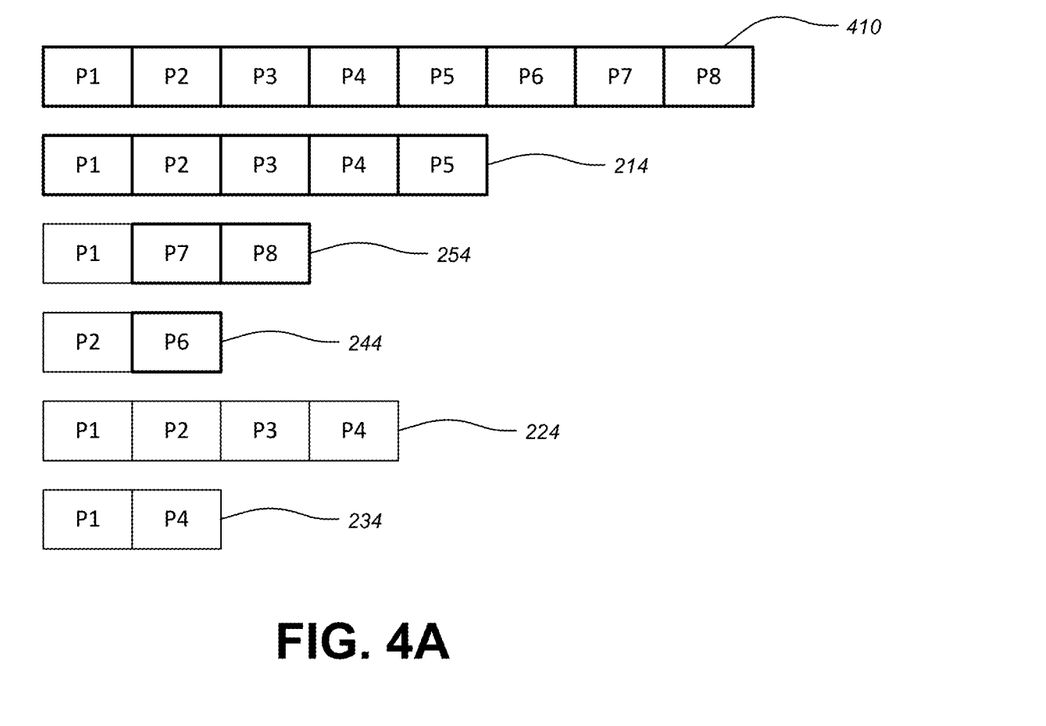
FIG. 4A illustrates an example of the IT assets being selected and placed one by one in a pilot test group based on a similarity between the attributes of the assets and an example set of pilot test parameters.
Figure 4B:
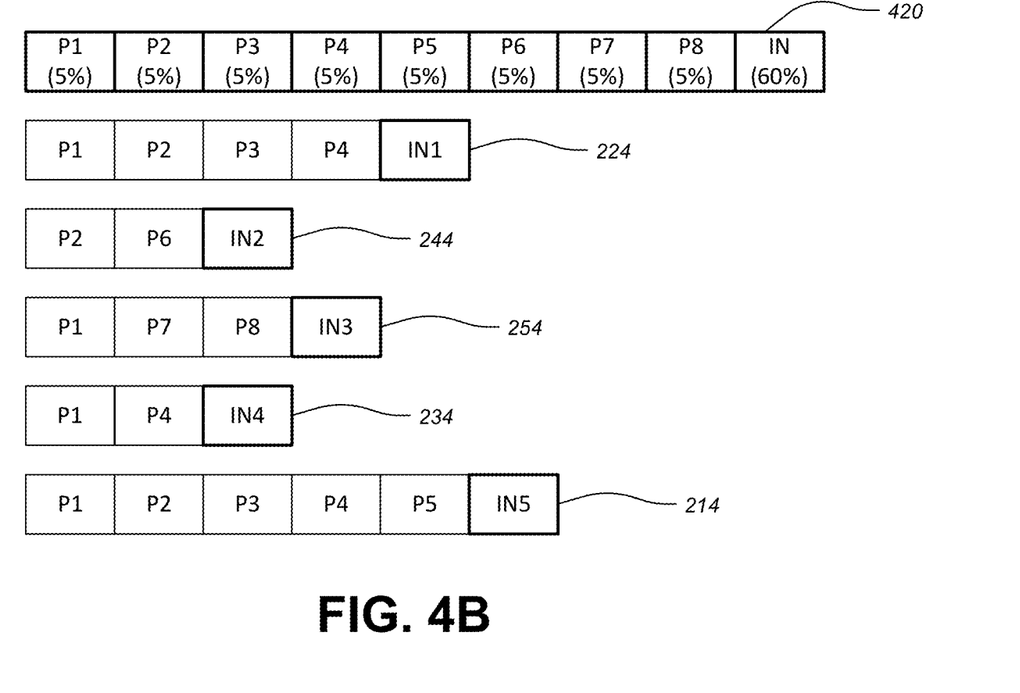
FIG. 4B illustrates another example of the IT assets being selected and placed one by one in a pilot test group based on a similarity between the attributes of the assets and another example set of pilot test parameters including different weights.
Figure 4C:
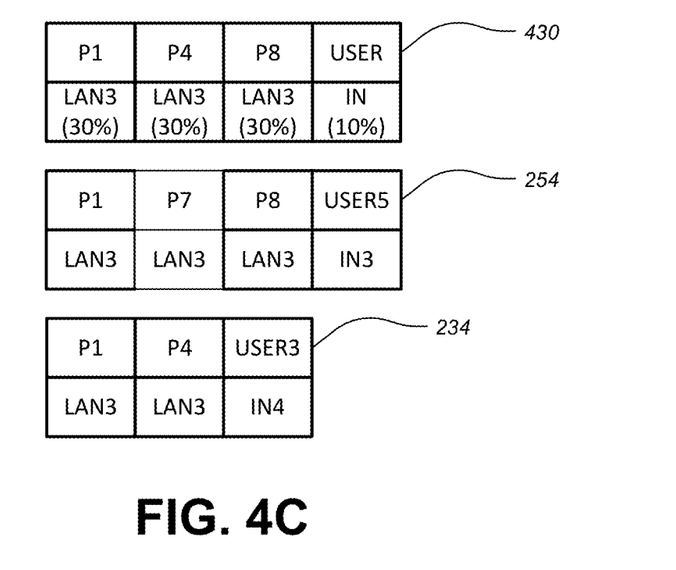
FIG. 4C illustrates another example of the IT assets being selected and placed one by one in a pilot test group based on a similarity between the attributes of the assets and another example set of a pilot test parameters including different weights.

At Step 320, the device 130 may determine a set of pilot test parameters. The parameters may be set by a user 132 of the device 130 or automatically determined by the device 130 based on the characteristics of the pilot test. In one example, the set of pilot test parameters may indicate the attributes required for the pilot test. Various example sets of pilot test parameters are shown in FIGS. 4A, 4B and 4C. FIG. 4A shows a first pilot test parameter set 410 determined for a first pilot test. The first pilot test parameter set 410 includes parameters P1, P2, P3, P4, P5, P6, P7, and P8. This indicates that any asset running any one of the software programs P1, P2, P3, P4, P5, P6, P7 and P8 needs to be considered in selecting the sample assets for the first pilot test. For example, when it is planned to roll out a new security software program, it may be critical to check if the new program causes any conflict with any of the existing software programs installed in all of the assets. In this scenario, the device 130 or user 132 may select the parameters to cover all of the P attributes, for example, P1, P2, P3, P4, P5, P6, P7 and P8, as shown in FIG. 4A.

In an implementation, the parameter set may include one or more parameters having a different weight. For example, FIG. 4B shows a second pilot test parameter set 420 for a second pilot test. Similar to the first parameter set 410, the second parameter set 420 includes the parameters P1, P2, P3, P4, P5, P6, P7, and P8. The second parameter set 420 also includes a user influence parameter IN. The second parameter set 420 is different from set 410 in that each parameter within the set 420 may be associated with a specific weight. For example, the second parameter set 420 may include the user influence parameter IN, which is weighted heavier (e.g., 60%) than the weight (e.g., 5%) of other parameters P1, P2, P3, P4, P5, P6, P7 and P8.

FIG. 4C shows a third pilot test parameter set 430 for a third pilot test. The third pilot test 430 parameter includes parameters P1, P4 and P8, and user influence parameter IN. In the third set 430 the user influence parameter IN is set to have a lower weight (e.g., 10%) than the weight (30%) of other parameters P1, P4 and P8.

Referring again to FIG. 3, at Step 330, one or more stop conditions may be set. The stop conditions may be set by the user 132 or automatically determined by the device 130. The stop conditions may be one or more conditions that stop the device 130 from further searching sample assets for a particular pilot test. For example, the stop condition may be met when all of the attribute combinations are covered. This cannot be achieved by a simple multiplication of the attributes of the assets because, for example, not every device model is produced by the same device maker. Typically, a total combination of the attributes is much less than the individual mathematical product of the entire attributes. For example, when there are about 5000 attribute combinations, less than about 3000 devices may need to be selected to completely cover the combinations.

Referring again to FIG. 3, at Step 330, one or more stop conditions may be set. The stop conditions may be set by the user 132 or automatically determined by the device 130. The stop conditions may be one or more conditions that stop the device 130 from further searching sample assets for a particular pilot test. For example, the stop condition may be met when all of the attribute combinations are covered. This cannot be achieved by a simple multiplication of the attributes of the assets because, for example, not every device model is produced by the same device maker. Typically, a total combination of the attributes is much less than the individual mathematical product of the entire attributes. For example, when there are about 5000 attribute combinations from about 3000 assets, at least 600 assets may be required to be tested to ensure the complete coverage, which is about 20% of the total asset population. This pilot sample size may still be too large for an organization to take a risk. As described below, by repeating ranking the assets and removing the highest ranked asset from the pool, the device 130 may be able to provide a number of the assets that match a pilot sample size desired by the organization. For example, when an organization having 3000 assets desires only 10% of the total asset population to be sampled, the device 130 may automatically select, based on the ranked order, 300 assets that provide the maximum coverage. The device 130 may also calculate the coverage provided by the selected 300 assets. Also, as described below, by removing a footprint of the highest ranked asset before initiating another ranking, the device 130 may be able to identify the assets providing the desired coverage quicker.

It may be necessary to select additional assets to provide redundancy. For example, only one of the selected sample assets may have an attribute covering a certain parameter of a pilot test parameters, and it is possible that the asset may not be available when the pilot test is being carried out. Hence, a predetermined percentage (e.g., 20%, 30% or 50%) of the assets may be additionally selected to provide a predetermined redundancy to the attributes of the selected assets. When the desired redundancy is met, the device 130 may no longer need to select any further assets. Hence, the stop condition may include an indication that the selected sample assets provide a predetermined redundancy. The redundancy may provide a failproof solution for a pilot testing. Also, the redundancy may allow the user 132 to select any number of the asset for the pilot test.

At Step 340, the device 130 may determine a similarity between the pilot test parameter set and the attributes of the assets in the pool. The similarity may be determined based one or more factors, including a number of the attributes of each asset that cover the pilot test parameter set. For example, referring to FIG. 4A, the first pilot test parameter set 410 includes parameters P1, P2, P3, P4, P5, P6, P7 and P8. The device 130 may then process the attributes of each asset to find an asset having the most attributes covering the parameter set 410. The device 130 may then select the first asset 210 because the first asset 210 has five attributes (P1, P2, P3, P4 and P5) that cover five out of the eight parameters (P1, P2, P3, P4, P5, P6, P7 and P8) in the parameter set 410, which is more than other assets.

When a parameter set includes one or more parameters having a different weight, the weight of each parameter may be considered in determining a similarity of an asset. For example, referring to FIG. 4B, the second pilot test parameter set 420 includes nine parameters P1, P2, P3, P4, P5, P6, P7, P8 and IN, of which the IN parameter is weighted heavier (60%) than other parameters (5%). In this scenario, the device 130 may evaluate each attribute of the asset based on the weight of the corresponding parameter. For example, for the attributes that indicate a degree or value (e.g., FREQ, DUR, IN and CO attributes), the device 130 may provide points proportional to the degree or value (e.g., ten points for the highest value and one point for the lowest value). Other attributes that do not indicate a degree or value (e.g., MK, MO, P, VER and LAN attributes) may be given fixed points (e.g., ten points). Then, the points of each attribute may be adjusted based on the weight of the corresponding parameter. For example, the ten points of the user influence attribute IN1 are multiplied by 60 (from the 60% weight of the corresponding parameter) such that 600 point are given to the attribute IN1. Similarity, the one point of the user influence attribute IN5 are multiplied by 60 such that 60 points are given to the attribute IN5. The ten points of the attributes P1, P2, P3, P4, P5, P6, P7, P8 are multiplied by 5 (from the 5% weight of the corresponding parameter) such that 50 points are given to each attribute. The device 130 may then add the points of each attribute set and determine the asset having the highest combined points. For example, in FIG. 4A, the second asset 220 has 800 points, which is higher than other assets. Hence, the device 130 may determine that the second asset 220 has the highest similarity to the pilot test parameter set 420.

Referring again to FIG. 3, at Step 350, the device 130 may provide a unique ranked order of the identified assets in the pool based on the similarity and place the asset having the highest similarity and ranked the highest to the pilot test parameter set in a pilot test group. At Step 360, the device 130 may determine a coverage by the assets accumulated in the pilot test group. Since only one asset has been selected so far, the coverage may be determined based on the only asset. For example, in FIG. 4A, the first asset has been selected and placed in the pilot test group. The first asset 210 has five attributes P1, P2, P3, P4, P5 that cover five out of the eight parameters in the parameter set 410. Hence, the coverage for the parameter set 410 by the attributes of the first asset 210 is 62.5%. As more assets are selected and placed in the pilot test group, the coverage increases. Optionally, at Step 362, the device 130 may determine a lift by adding the asset to the pilot test group. A lift may indicate incrementation of the attributes by adding the asset to the pilot test group. For example, every time an asset is selected and placed in a pilot test group, a lift of the attributes of the selected asset may increase, which may be used for statistical analysis of the selected sample assets.

At Step 364, the device 130 may determine a redundancy by one or more assets accumulated in the pilot test group. Since only one asset has been added to the pilot test group so far, the device 130 may determine that a predetermined redundancy has not been met. At Step 370, the device 370 may determine whether the one or more stop conditions have been met. As described above, the stop condition may be met when the assets accumulated in the pilot test group provide a predetermined coverage. Alternatively, the stop condition may be met when the asset accumulated in the pilot test group provide a predetermined coverage and predetermined redundancy. For example, when the pilot test parameter set is not completely covered by the assets accumulated in the pilot test group, a pilot test deployed on the assets currently in the pilot test group may not provide a complete coverage. Also, when the assets accumulated in the pilot test group provide very small (e.g., less than 5%) redundancy or no redundancy at all, the pilot test may fail due to unavailability of several assets. Hence, the process 300 may loop back to select another asset having the highest similarity when the stop conditions are not met (No at Step 370).

At Step 380, prior to selecting another asset, the device 130 may remove the footprint of the asset placed in the pilot test group at Step 350. The footprint of the asset may be removed by, for example, removing the asset placed in the pilot test group from the pool of the assets identified at Step 310. Also, the attributes of the asset that cover the pilot test parameter set may be removed from the pilot parameter set if no redundancy is associated with the corresponding parameters. The attributes may not be removed if redundancy is associated with any of the corresponding parameters until the redundancy is met. Then, the process 300 may loop back to Step 340 to identify another asset having the highest similarity from the updated asset pool. The device 130 may then select another asset based on a similarity between the updated pilot test parameter set and the attributes of the assets in the updated pool. For example, referring again to FIG. 4A, after the first asset 210 having the first attributes 214 has been selected and placed in the pilot test group, the device 130 may update the asset pool identified at Step 310 by removing the first asset 210 from the asset pool such that the first asset 210 is no longer selectable. Also, the device 130 may update the first pilot test parameter set 410 by removing the parameters P1, P2, P3, P4, and P5 that are covered by the attributes P1, P2, P3, P4, and P5 of the first asset 210. The updated first pilot test parameter set 410 may now show parameters P6, P7, and P8. Then, the device 130 may determine which one of the assets 220, 230, 240, and 250 remaining in the updated asset pool has the highest similarity to the updated first pilot test parameter set 410, which includes P6, P7 and P8. The device 130 may then select the fifth asset 250 as the asset having the highest similarity because the fifth attributes 254 has two attributes P7 and P8 that cover two out of the three remaining parameters of the updated parameter set 410.

Upon selecting the asset having the highest similarity (at Step 340) for the second time and placing the selected asset in the pilot test group (at Step 350), the device 130 may determine the coverage provided by the assets accumulated in the pilot test group (at Step 360). For example, in FIG. 4A, the first and fifth assets 210 and 250 in the pilot test group cover seven out of the eight parameters of the parameter set 410, which indicates that the coverage provided by the pilot test group is currently 87.5%. If this coverage meets the stop condition (Yes, at Step 370), the process 300 may move to Step 390. If the coverage does not meet the stop condition (No, at Step 370), the device 130 may repeat the Steps 340, 350, 360, 364 and 380 until the one or more stop conditions are met (Yes, at Step 370).

If one or more stop conditions are not met (No, at Step 370), the process 300 may return back to Step 380. In keeping with the previous example, after the first and fifth assets 210, 250 have been selected and placed in the pilot test group, the device 130 may further update the parameter set 410 by removing parameters P7 and P8. The updated parameter set 410 may now include the parameter P6 only. The device 130 may then remove the footprint of the selected fifth asset (at Step 380) and then select the forth asset 240 because the second and third assets 220, 230 do not have any attribute corresponding to the remaining parameter P6. By repeating the Steps 340, 350, 360, 364 and 380, the device 130 may minimize a number of the assets providing the maximum coverage for the pilot test parameter set.

After adding the fourth asset 240 to the pilot test group, the device 130 may determine the coverage by the first, fourth and fifth assets 210, 240, 250 in the pilot test group, which is 100%. If this meets the stopping condition, the device 130 may no longer select another asset (Yes at Step 370). If the stopping condition is set to have a certain redundancy (e.g., 20% redundancy) in addition to the complete coverage, the device 130 may continue to select additional assets to provide the desired redundancy. For example, in FIG. 4A, the device may update the asset pool by removing the first, fourth and fifth assets 210, 240, 250 from the pool, thereby leaving the second and third assets 220, 230 in the pool. Then, the device 130 may determine which one of the assets remaining in the asset pool provides more redundancy and may rank them accordingly. Since the second asset 220 have more attributes 224, the device 130 may rank the second asset 220 higher than the third asset 230. The device 130 may then select the second asset 220 and then select the third asset 230 if the required redundancy is still not met after the selection of the second asset 220 (No, Step 370). The redundancy may be calculated after each asset is selected and placed in the pilot test group.

Referring again to FIG. 3, once the one or more stop condition is met (Yes at Step 370), the device 130 may process the attributes of the assets accumulated in the pilot test group to calculate statistic confidence for the coverage by the assets (at Step 390). The statistic coverage may be calculated by leveraging a statistical formula for proportions when a population size is finite. For example, to calculate whether a parameter is statistically covered by the accumulated assets, the device 130 may calculate a margin of error with 95% confidence based on the following formula, where the reported portion or percentage p is 0.01 (assuming 1% error), the population size N is 100 and the sample size n is 1:

$$\text{Margin of Error} = \text{Confidence Level} \sqrt{\frac{p*(1-p)(N-n)}{n*(N-1)}}$$

Upon calculating the margin of error, the device 130 may determine whether the pilot test parameter set is statistically covered by the assets of the pilot test group. A common margin of error in the industry is 2.5%. This may allow the device 130 to provide whether a particular attribute (e.g., software program or addon) would be statistically covered by the pilot program. Hence, the user 130 may be able to roll out the pilot program without worrying about any attribute missing in the pilot test.

At Step 392, the device 130 may count the percentage of the assets that are statistically covered by the pilot test group. The Step 392 may also be performed each time an asset is selected and placed in the pilot test group. For example, after an asset is selected and placed in the pilot test group, the device 130 may calculate how many assets in the asset pool are statistically covered. Then, the device 130 may generate and output, via a user interface, pilot group suggestions and a list of the assets in a ranked order, which may allow the user 132 to incrementally understand the experience and make decisions on the suggestions generated by the device 130.

Figure 5A:
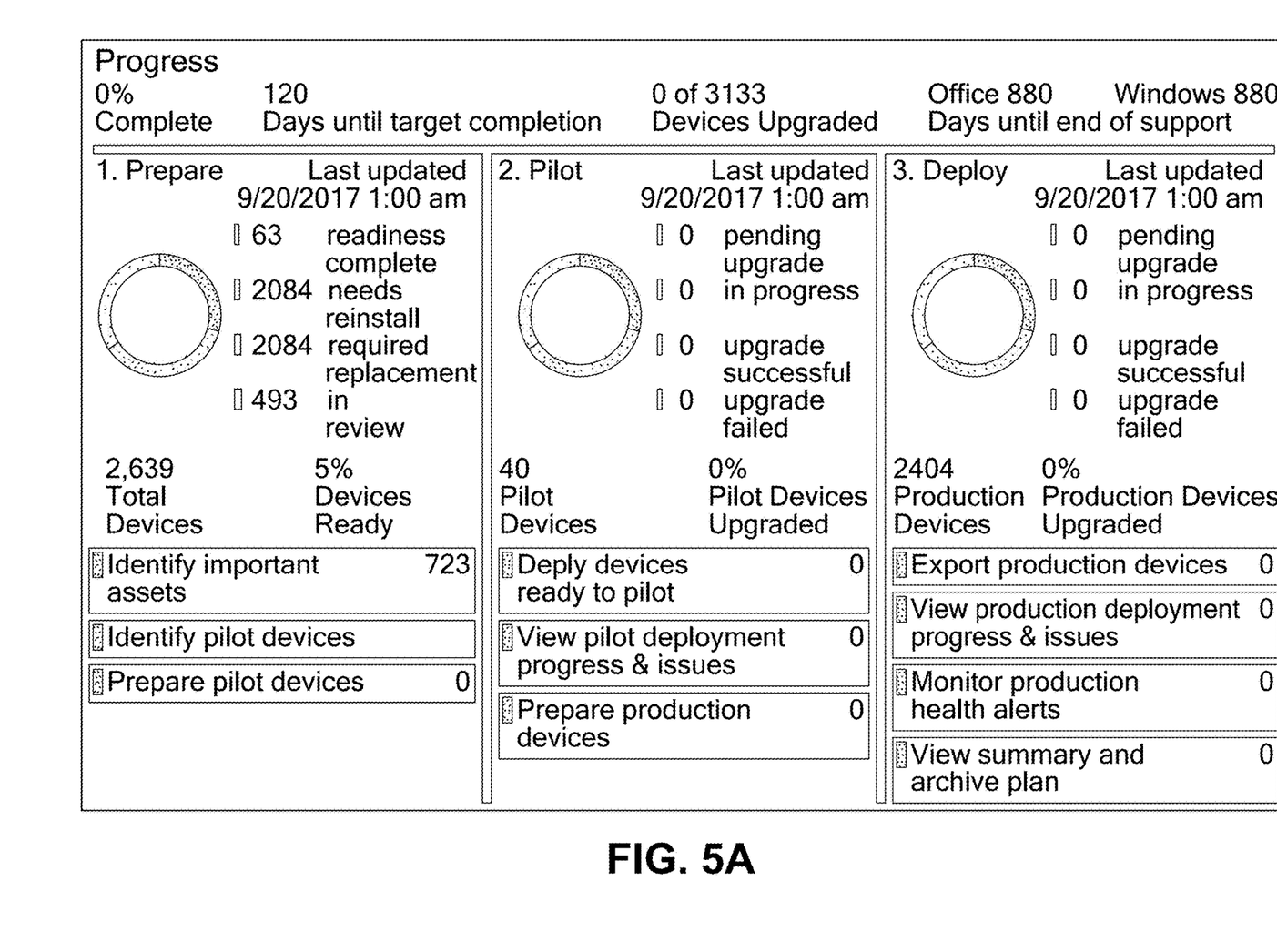
FIGS. 5A, 5B and 5C illustrate an example of user interfaces for automatically selecting sample assets for a pilot test.
Figure 5B:
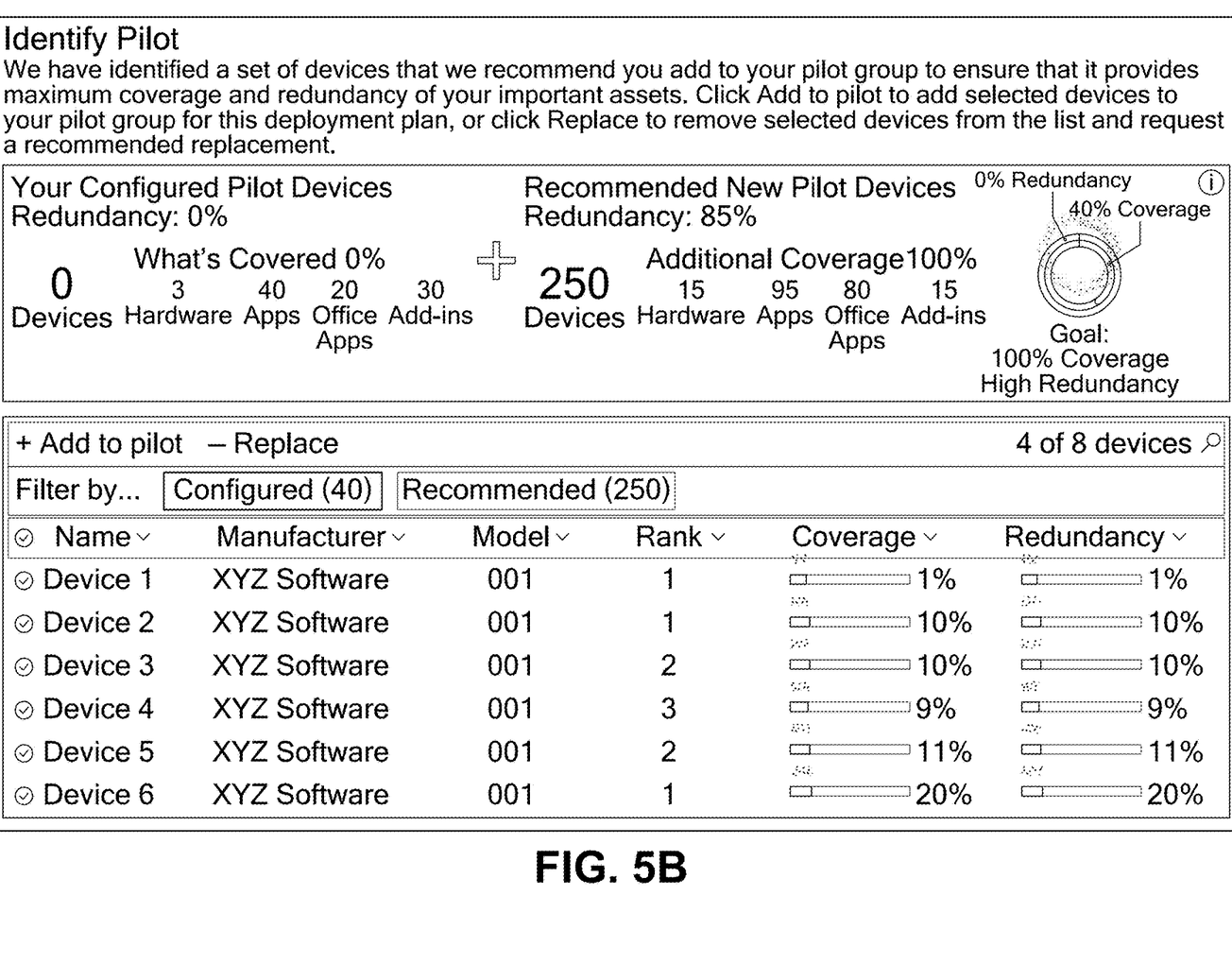
Figure 5C:
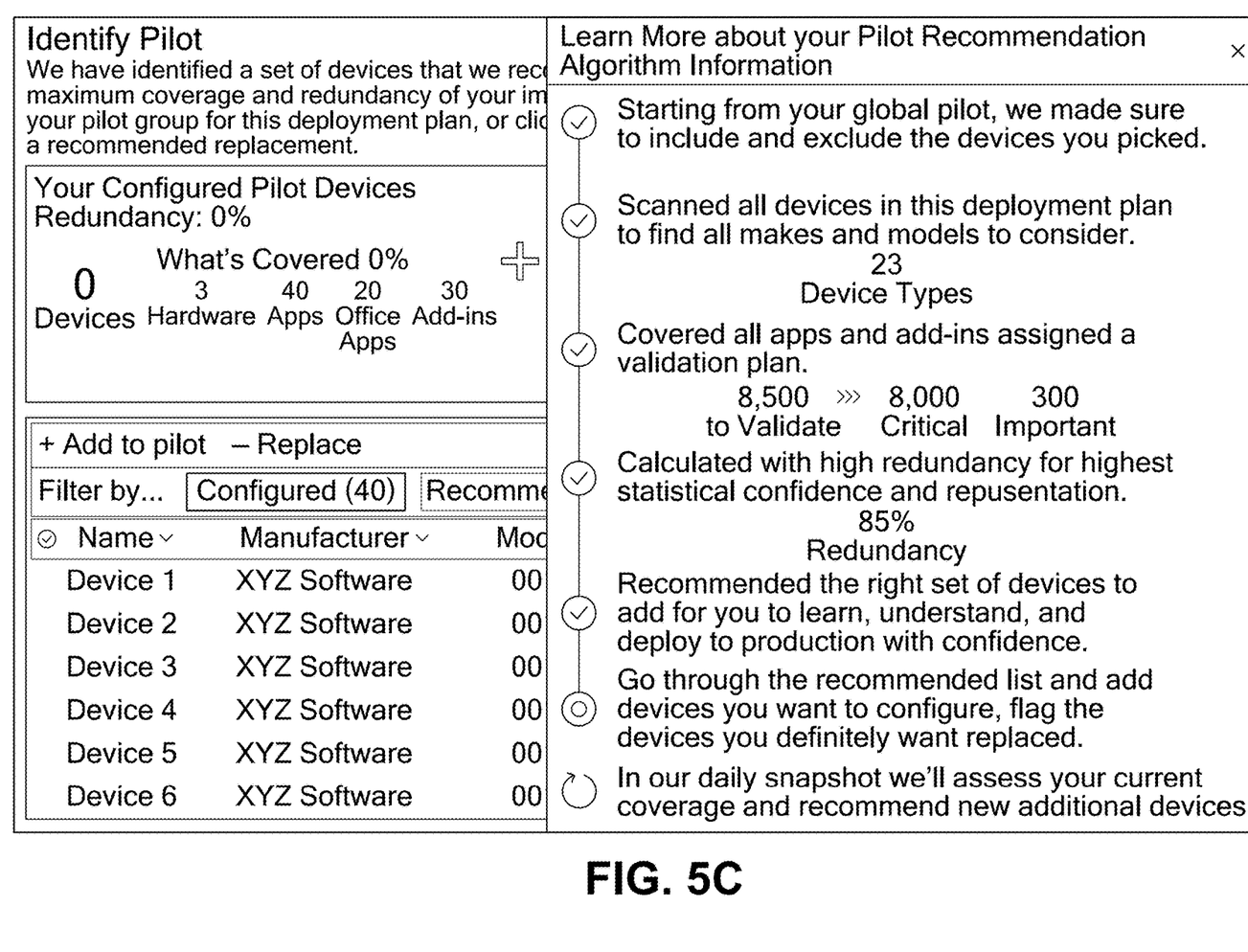

FIGS. 5A, 5B and 5C illustrate user interfaces (UIs) for automatically selecting sample assets for a pilot test. The UI may be implemented by the device 130 or any other device connected to the network 110. FIG. 5A shows the UI providing overviews for the entire rollout process, including pre-pilot preparation (Prepare), pilot rollout (Pilot) and full deployment (Deploy). The "Prepare" overview shows a number of total assets and identification of important assets and pilot assets, which corresponds to the automatic selection of sample assets described above. FIG. 5B shows the UI for identifying pilot sample assets with a recommendation for new pilot assets, which may be generated automatically as described above. The UI also generates the unique ranking of the assets based on a similarity of the attributes of each asset to the pilot test parameter set. In addition to the ranking, the UI may provide a coverage and redundancy provided by each selected asset. FIG. 5C shows the UI providing detailed information about the recommended pilot sample assets, including a total number of the currently covered assets and the redundancy (e.g., 85%) provided by the currently selected assets (e.g., 250 assets). As such, the UI may be implemented to provide pilot group suggestions and a list of the assets in a ranked order, which may allow the user 132 to incrementally understand the experience and make decisions on the suggestions generated by the device 130.

Figure 6:
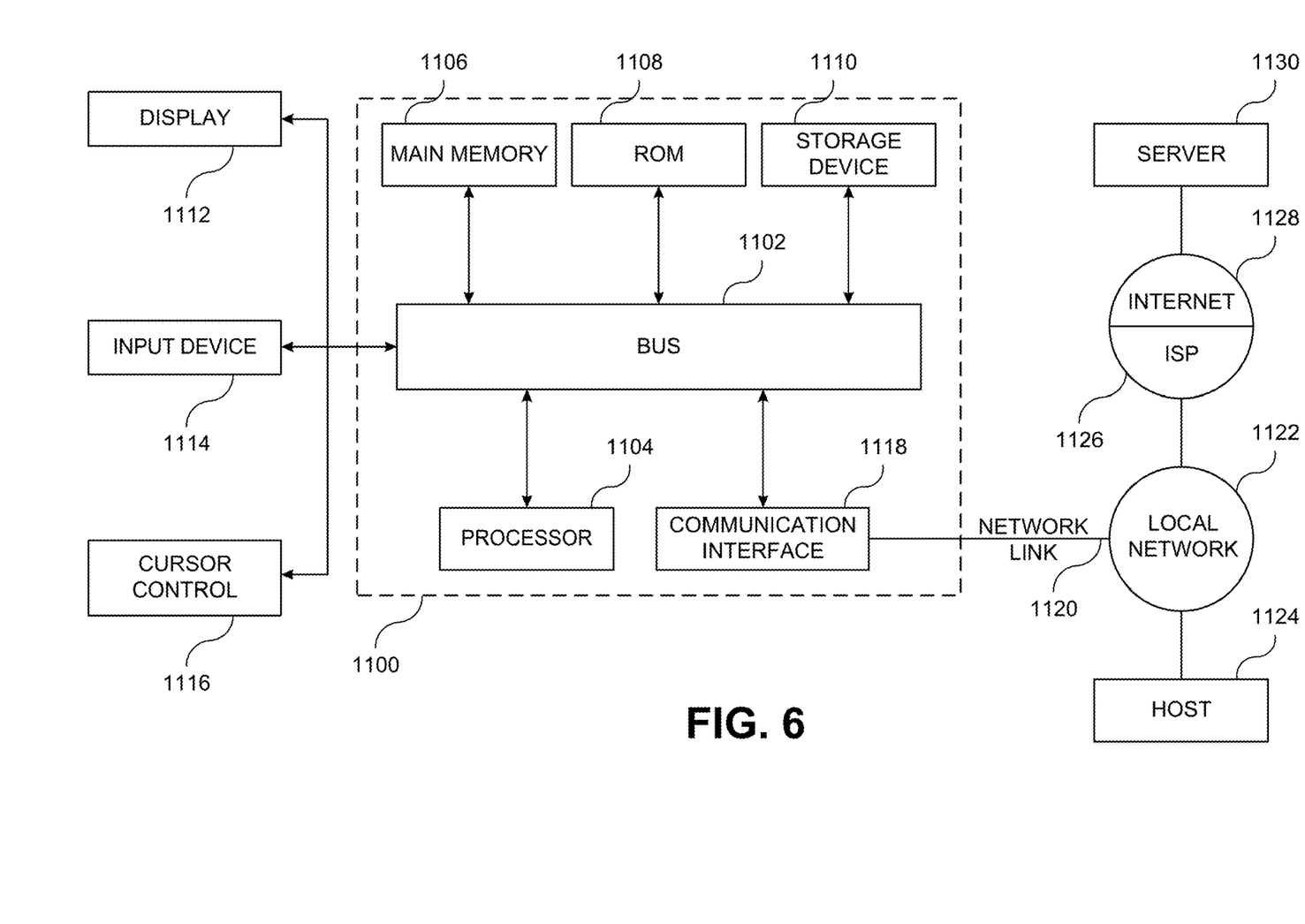
FIG. 6 illustrates a block diagram showing an example computer system upon which aspects of this disclosure may be implemented.

FIG. 6 illustrates a block diagram showing an example computer system 1100 upon which aspects of this disclosure may be implemented. The computer system 1100 may correspond to the server 120 or the device 130 shown in FIG. 1. The computer system 1100 includes a bus 1102 or other communication mechanism for communicating information, and a processor 1104 coupled with the bus 1102 for processing information. The computer system 1100 also includes a main memory 1106, such as a random-access memory (RAM) or other dynamic storage device, coupled to the bus 1102 for storing information and instructions to be executed by the processor 1104. The main memory 1106 also may be used for storing temporary variables or other intermediate information during execution of instructions to be executed by the processor 1104. The computer system 1100 can implement, for example, one or more of, or portions of the server 120 or device 130.

The computer system 1100 can further include a read only memory (ROM) 1108 or other static storage device coupled to the bus 1102 for storing static information and instructions for the processor 1104. A storage device 1110, such as a flash or other non-volatile memory can be coupled to the bus 1102 for storing information and instructions.

The computer system 1100 may be coupled via the bus 1102 to a display 1112, such as a liquid crystal display (LCD), for displaying information. One or more user input devices, such as the example user input device 1114 can be coupled to the bus 1102, and can be configured for receiving various user inputs, such as user command selections and communicating these to the processor 1104, or to the main memory 1106. The user input device 1114 can include physical structure, or virtual implementation, or both, providing user input modes or options, for controlling, for example, a cursor, visible to a user through the display 1112 or through other techniques, and such modes or operations can include, for example virtual mouse, trackball, or cursor direction keys.

The computer system 1100 can include respective resources of the processor 1104 executing, in an overlapping or interleaved manner, respective program instructions. Instructions may be read into the main memory 1106 from another machine-readable medium, such as a storage device 1110. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media can include, for example, optical or magnetic disks, such as the storage device 1110. Transmission media can include optical paths, or electrical or acoustic signal propagation paths, and can include acoustic or light waves, such as those generated during radio-wave and infra-red data communications, that are capable of carrying instructions detectable by a physical mechanism for input to a machine.

The computer system 1100 can also include a communication interface 1118 coupled to the bus 1102, for two-way data communication coupling to a network link 1120 connected to a local network 1122. The network link 1120 can provide data communication through one or more networks to other data devices. For example, the network link 1120 may provide a connection through a local network 1122 to a host computer 1124 or to data equipment operated by an Internet Service Provider (ISP) 1126 to access through the Internet 1128, a server 1130, for example, to obtain code for an application program.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Other implementations are contemplated. For example, the unique ranking of the assets generated by the device 130 discussed above is in an ascending order from the height to the lowest similarity, but the ranking may be in a different order based on different measures. For example, the unique ranking may be in a descending order from the lowest to highest similarity, or the ranking may be determined based on a number of attributes, asset purchase year, prior repair record, purchase price, etc. of each asset.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A device comprising:
   one or more processors; and,
   memory in communication with the one or more processors, the memory comprising executable instructions that, when executed, cause the one or more processors to control the device to perform functions of:
   identifying a pool of assets to be covered by a pilot test, the pool of assets being in communication with the device over a communication network;
   receiving over the communication network attributes associated with the identified assets in the pool;
   identifying a set of pilot test parameters associated with the pilot test;
   comparing the attributes of the assets with the identified set of pilot test parameters associated with the pilot test;
   based on a result of the comparison, providing a unique ranked order of the identified assets in the pool and selecting an asset from the unique ranked order to be placed in a pilot test group;
   determining if a predetermined stop condition has been satisfied based on a coverage of the set of pilot test parameters by one or more assets accumulated in the pilot test group; and,
   upon determining that the predetermined stop condition has not been satisfied, removing a footprint of the asset placed in the pilot test group from the pool and the set of pilot test parameters.

2. The device of claim 1, wherein the function of comparing the attributes of the assets with the identified set of pilot test parameters includes a function of comparing the attributes of the assets with the identified set of pilot test parameters to determine a similarity between the attributes of the assets and the set of pilot test parameters, and,
   wherein the function of selecting the asset from the unique ranked order includes a function of selecting an asset having a highest similarity with the set of pilot test parameters for placement in the pilot test group, wherein the similarity is determined based on a number of the attributes of the asset satisfying the set of pilot test parameters.

3. The device of claim 1, wherein the stop condition includes a condition that the attributes of the assets accumulated in the pilot test group provide a predetermined coverage of the assets in the pool.

4. The device of claim 3, wherein the predetermined condition includes a condition that the attributes of the assets accumulated in the pilot test group provide a complete coverage for the set of pilot test parameters.

5. The device of claim 1, wherein the function of removing the footprint includes functions of:
   removing the selected asset from the identified pool of the assets, and,
   removing, from the set of pilot test parameters, one or more parameters satisfied by one or more attributes of the selected asset.

6. The device of claim 5, wherein the instructions further includes instructions that, when executed, cause the one or more processors to control the device to perform functions of repeating the functions of comparing, providing the unique ranked order, determining if the predetermined stop condition has been met, and removing the footprint until the predetermine condition is satisfied.

7. The device of claim 1, wherein the instructions further include instructions that, when executed, cause the one or more processors to control the device to perform a function of determining a redundancy provided by the attributes of the assets accumulated in the pilot set group, and,
   wherein the stop condition includes a condition that the attributes of the assets accumulated in the pilot test group provide a predetermine redundancy for the set of pilot test parameters.

8. The device of claim 1, wherein the set of pilot test parameters includes parameters having different weights, wherein the function of selecting the asset from the ranked order includes a function of selecting the asset based on the different weights of the parameters.

9. The device of claim 1, wherein the instructions further include instructions that, when executed, cause the one or more processors to control the device to a perform functions of:
calculating a statistical confidence for the coverage by the pilot test group; and,
counting a proportion of the assets that are statistically covered by the pilot test group.

10. The device of claim 1, wherein the instructions further include instructions that, when executed, cause the one or more processors to control the device to perform a function of determining a lift by adding the asset placed to the pilot test group, the lift indicating incrementation of the attributes by adding the asset to the pilot test group.

11. The device of claim 1, wherein the set of pilot test parameters includes one or more of a hardware parameter, a software parameter and a user parameter.

12. The device of claim 11, wherein the hardware parameter includes at least one of a maker, a model and a component,
wherein the software parameter includes at least one of a program name, a program publisher, a program version, and a program language, an addon, and,
wherein the user parameter includes at least one of influence and collaborativeness of a user of the asset.

13. A method comprising:
identifying a pool of assets to be covered by a pilot test, the pool of assets being in communication with a device over a communication network;
receiving at the device and over the communication network attributes associated with the identified assets in the pool;
identifying a set of pilot test parameters associated with the pilot test;
comparing the attributes of the assets with the identified set of pilot test parameters associated with the pilot test;
based on a result of the comparison, providing a unique ranked order of the identified assets in the pool and selecting an asset from the unique ranked order to be placed in a pilot test group;
determining if a predetermined stop condition has been satisfied based on a coverage of the set of pilot test parameters by one or more assets accumulated in the pilot test group; and,
upon determining that the predetermined stop condition has not been satisfied, removing a footprint of the asset placed in the pilot test group from the pool and the set of pilot test parameters.

14. The method of claim 13, wherein:
comparing the attributes of the assets with the identified set of pilot test parameters includes comparing the attributes of the assets with the identified set of pilot test parameters to determine a similarity between the attributes of the assets and the set of pilot test parameters, and
selecting the asset from the unique ranked order includes selecting an asset having a highest similarity with the set of pilot test parameters for placement in the pilot test group, and the similarity is determined based on a number of the attributes of the asset satisfying the set of pilot test parameters.

15. The method of claim 13, wherein the stop condition includes a condition that the attributes of the assets accumulated in the pilot test group provide a predetermined coverage of the assets in the pool.

16. The method of claim 13, further comprising repeating the comparing, providing the unique ranked order, determining if the predetermined stop condition has been met, and removing the footprint until the predetermine condition is satisfied.

17. The method of claim 13, wherein the removing the footprint includes:
removing the selected asset from the identified pool of the assets: and,
removing, from the set of pilot test parameters, one or more parameters satisfied by one or more attributes of the selected asset.

18. The method of claim 13, further comprising determining a redundancy provided by the attributes of the assets accumulated in the pilot set group, and,
wherein the stop condition includes a condition that the attributes of the assets accumulated in the pilot test group provide a predetermine redundancy for the set of pilot test parameters.

19. The method of claim 13, further comprising:
calculating a statistical confidence for the coverage by the pilot test group; and,
counting a proportion of the assets that are statistically covered by the pilot test group.

20. A system comprising:
a plurality of assets connected to a communication network; and
a device configured to communicate with the plurality of assets via the communication network, the device comprising one or more processors and memory in communication with the one or more processors, the memory comprising executable instructions that, when executed, cause the one or more processors to control the device to perform functions of:
identifying a pool of the assets to be covered by a pilot test;
receiving over the communication network attributes associated with the identified assets in the pool;
identifying a set of pilot test parameters associated with the pilot test;
comparing the attributes of the assets with the identified set of pilot test parameters associated with the pilot test;
based on a result of the comparison, providing a unique ranked order of the identified assets in the pool and selecting an asset from the unique ranked order to be placed in a pilot test group;
determining if a predetermined stop condition has been satisfied based on a coverage of the set of pilot test parameters by one or more assets accumulated in the pilot test group; and,
upon determining that the predetermined stop condition has not been satisfied, removing a footprint of the asset placed in the pilot test group from the pool and the set of pilot test parameters.

* * * * *